April 25, 1972   R. M. CHAMBERLIN ET AL   3,658,955
PROCESS FOR PRESSURE CASTING OF TUBULAR REVERSE
OSMOSIS MEMBRANES USING AIR DRIVEN CASTING BOBS
Filed April 15, 1970

WITNESSES
Daniel P. Cillo
Alfred D. Colaizzi

INVENTORS
James L. Emswiller, Regis R. Stana
Richard M. Chamberlin, Andrew S. Calderwood
Alex Mich Jr.
ATTORNEY

United States Patent Office 3,658,955
Patented Apr. 25, 1972

3,658,955
PROCESS FOR PRESSURE CASTING OF TUBULAR REVERSE OSMOSIS MEMBRANES USING AIR DRIVEN CASTING BOBS
Richard M. Chamberlin, McKeesport, James L. Emswiller, Bethel Park, Andrew S. Calderwood, Monroeville, and Regis R. Stana, Murrysville, Pa., assignors to Westinghouse Electric Corporation, Pittsburgh, Pa.
Filed Apr. 15, 1970, Ser. No. 28,605
Int. Cl. B29c 13/00; B29d 27/04
U.S. Cl. 264—45
8 Claims

ABSTRACT OF THE DISCLOSURE

A unitary, tubular, reverse osmosis membrane is made by placing a viscous casting solution containing a cellulosic film forming material, a solvent, and a leachable swelling agent into a hollow tube, placing a casting bob having a circular cross section at its widest point into one end of the tube, pushing the casting bob through the casting solution with a gas under pressure to form a continuous film of casting solution on the inside of the hollow tube, exposing the film to air, and contacting the film with a leaching liquid to form a reverse osmosis membrane.

BACKGROUND OF THE INVENTION

This invention relates to an improved method of casting unitary tubular, semipermeable membranes for use in reverse osmosis fluid purification systems.

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to described this process.

A reverse osmosis system has application in many areas. The areas of greatest present interest are making potable water from brackish or polluted water and cleaning up waste streams. Other applications are taste improvement of potable but objectionable water, softening of municipal waters, water sterilization and the concentration of food (orange juice, tomato juice, cheese whey, and syrups).

Reverse osmosis water purification systems have taken on many forms including plate and frame, hollow fine fiber, spiral wound and tubular types. The configuration which appears to have the greatest commercial appeal at the present time is the tubular type reverse osmosis system. The tubular type system employs a semipermeable reverse osmosis membrane in the form of a long straight tube containing an active osmotic skin. This membrane is inserted and sealed inside a porous support module so that water to be purified can be contained inside the tube under pressure. The preferred type tubular membranes are of unitary construction where the membrane is one continuous piece of material and does not have to be rolled and glued to form a tube, thus eliminating a process step.

Unitary tubular membranes have been made by loading a long casting tube with casting solution, gravity dropping the tube over a stationary casting bob to form a film and then immersing the tube in a bath of water to leach the solvents and swelling agents from the film and form a membrane. This method, described in desalination, vol. 1, No. 1, April 1966, pp. 35–49, requires considerable time to load the casting solution, cast the membrane, clean the tube and bob and prepare the facility to cast the next membrane. It is also likely to produce variable membranes unless extremely straight precision bore casting tubes are used.

SUMMARY OF THE INVENTION

Our method solves the prior art problems by pressure casting unitary, tubular membranes in an efficient manner. Briefly, our method consists of (1) loading membrane casting solution into one or a plurality of supported hollow smooth bore casting tubes, (2) inserting a hydraulically stable, self-centering casting bob into each casting tube, (3) driving the casting bob through the casting solution in each tube with a gas under pressure, which preferably is saturated with respect to solvent, to form a continuous film of casting solution on the inside of each tube, (4) exposing the cast film to air and (5) contacting the cast film with a suitable leaching liquid in such a manner and for a length of time necessary to produce a satisfactory reverse osmosis membrane having an active osmotic skin.

Tubular, four foot long, one piece membranes produced by the improved method described above are consistent in structure and thickness throughout their lengths, can be fabricated in from one to three minutes, and have provided 24.5 gallons of purified water per day per square foot of membrane surface at 600 p.s.i.g. and 90 percent salt rejection. Also, since most long casting tubes are not perfectly straight, a superior membrane will be produced by this method since under pressure the casting bob becomes most self centering and will follow the hollow tube path without scraping the tube wall if it bends slightly. This method eliminates the requirement of using extremely expensive quality glass tubes as casting tubes.

BRIEF DESCRIPTION OF THE DRAWINGS

For a better understanding of the invention, reference may be had to the preferred embodiments, exemplary of the invention shown in the accompanying drawings, in which.

DESCRIPTION OF THE PREFERRED EMBODIMENTS

Figure 1:
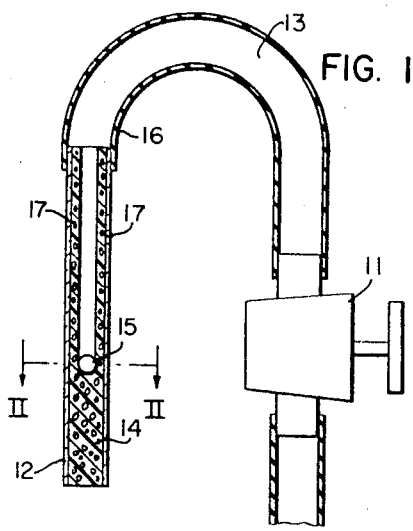
FIG. 1 shows a schematic drawing of a simplified apparatus which may be used in the method of this invention to fabricate reverse osmosis membranes.

Refering now to FIG. 1 of the drawings, a valve 11 is shown together with casting tube 12 and air hose connection 13. Within the casting tube is membrane casting solution 14 and casting bob 15. FIG. 1 shows the casting bob being driven through the casting solution by a gas under pressure.

The casting soluitons used in the present invention contain leachable organic solvents and leachable pore producing swelling agents adapted to permit the structural organization of an osmotic skin from a film forming material by evaporation and leaching of the carrier solution.

The polymeric film forming material can be a cellulosic ether or cellulosic ester derivative such as cellulose acetate, cellulose acetate-butyrate, cellulose propionate or ethyl cellulose. Suitable leachable organic pore producing swelling agents can include triethyl phosphate, tetrahydrofurfuryl phosphate and substantially water soluble liquid amides such as formamide ($HCONH_2$), dimethyl formamide, methyl formamide or ethyl formamide. Suitable leachable organic solvents would include acetone, methyl ethyl ketone, ethyl alcohol and methyl alcohol.

These casting solutions are well known in the art, and reference may be made to U.S. 3,133,132 and 3,344,214 for further details on other compositions that can be used in this invention. Generally, the standard casting solution in the art containing 25 weight percent cellulose acetate, 30 weight percent formamide and 45 weight percent acetone is used. Other ingredients may be included in the casting solution, however, to modify membrane characteristics to various degrees. Reference may be made to Modern Plastics, May 1968, pp. 141–148 for a detailed discussion on the perm-selectivity of these cellulose acetate reverse osmosis membranes.

The hollow casting tube, shown 12 in FIG. 1, can be made of glass, plastics such as nylon and Teflon (polytetrafluoroethylene) which are not attacked by casting solutions, or metals such as stainless steel or copper or others which have a releasable inner surface i.e., some metals may require a nonstick inner coating so that the membrane will release from the tube wall after the leaching step. The inside of the tube must be smooth and relatively straight.

Generally, the casting tube is loaded by attaching a hose to a vacuum pump while a first tube end 16 is in a reservoir of casting solution, thus drawing the viscous solution part way up the tube. A slug of casting solution could also be loaded into the tube by means of a pressurized dispenser gun or by other methods. After the end of the casting tube is cleaned of excess solution the hose 13 is disconnected, and the tube end containing the viscous casting solution reversed, so that it is now in an upright position. Then the bob 15 is placed in tube end 16 which was immersed in the casting solution, the hose reconnected and a gas fed through regulator or valve 11 under pressure, to drive the bob down through the casting tube pushing the casting solution around and in front of it as shown in FIG. 1. The bob may be driven up through the tube but this presents a problem of cleaning excess casting solution.

Figure 2:
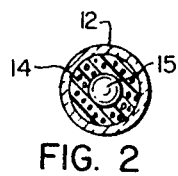
FIG. 2 shows a cross-section of the bob and casting tube.

The casting bob 15 may be a sphere, a tapered bullet shaped plug, or other hydralically stable self-centering geometry having a round cross-section at its widest point. The casting bob must have an outer diameter 0.02 to 0.08 inch smaller than the inner diameter of the casting tube. A clearance below 0.02 inch will produce reverse osmosis membranes that are too fragile and a clearance greater than 0.08 inch will cause film flow resulting in uneven membranes. The preferred casting bob dimensional range for use in this invention is an outer bob diameter 0.03 to 0.06 inch smaller than the inner diameter of the casting tube. As shown in FIG. 2, a cross section along line 2 in FIG. 1, a film is batch-cast in the annulus between the inside surface of the casting tube and the widest point of the casting bob. The film thickness is one-half the difference between the inner diameter of the tube and the outer diameter of the casting bob.

Although dry air may be used to drive the bob through the casting solution 14 to form a continuous cast film 17, as shown in FIG. 1, on the inside of the casting tube, more uniform pure water flux and rejection properties are attained along the full length of the membrane if the gas is saturated with acetone, or other organic solvent which may be used in the casting solution formulations. Nitrogen gas saturated with acetone gave very good results. Argon gas could also be used. Preferably the gas is water dry. The excess casting solution and the casting bob can be caught in a reservoir of casting solution after being blown through the tube.

The casting bob is driven through the casting solution and the casting tube under gas pressure at a velocity of between about 0.3 to 12 inches/second with a preferred range of between about 1 to 4 inches/second. The pressure required to drive the bob through a 0.5 inch diameter tube is typically between about 2–30 p.s.i.g. with about 8–10 p.s.i.g. providing a velocity of about 3 inches/second. Generally the faster the velocity the more the bob is self-centering. Under 0.3 inch/second requires too much time especially in any commercial application and the bob becomes less self centering.

Air is circulated slowly past the freshly cast membrane for about 10 to 150 seconds. Then the tube with the membrane within it is plunged into a leaching bath which may contain water, water-organic or other suitable leaching liquid at a temperature of between about 32 to 36° F. The tube and membrane are left in the leaching liquid bath between about 20 to 90 minutes after which the membrane tube shrinks so that it no longer adheres to the smooth inside of the casting tube and is released from the tube. Shrinkage is due to the leaching of the formamide and acetone from the film by the ice water. The leaching forms a thin active osmotic skin on the porous membrane structure. The membrane may then be cured in a hot water bath at temperatures up to 200° F. The membrane is then ready for installation in a porous reverse osmosis membrane support and further processing.

Figure 3:
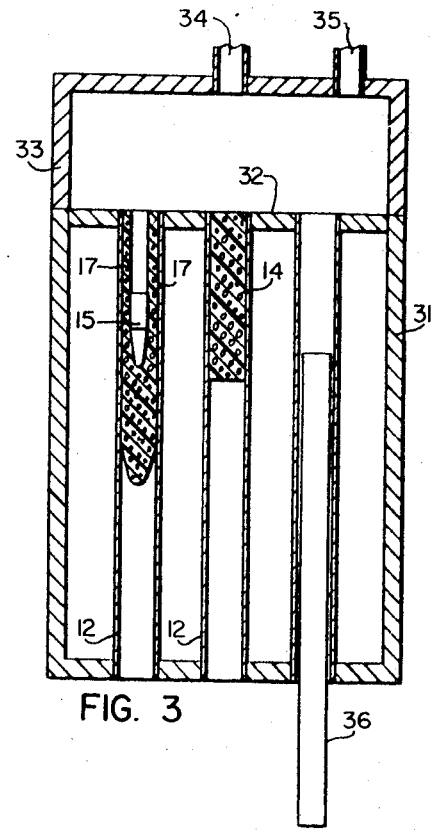
FIG. 3 shows a schematic drawing of another apparatus which may be used in the method of this invention to fabricate reverse osmosis membranes.

Another apparatus for pressure casting reverse osmosis membranes is shown in FIG. 3 of the drawings which shows an initial slug of casting solution in a tube, a bob being driven through the casting solution, and a finished membrane being released from the tube after leaching. Support 31 holds a plurality of casting tubes 12. A slug of casting solution 14 is pressure inserted in the tubes using for example a grease gun. The top of the support 32 is wiped of excess casting solution, so that the membrane to be formed will not stick, and a casting bob 15 is inserted in each tube. A casting head 33 is then secured to the support 32. The casting head will have a gas inlet 34 and may have a leaching solution inlet 35. Gas under pressure is then supplied through inlet 34, with inlet 35 closed, to drive the casting bobs through the casting solution to form a continuous film 17 on the inside of the tube walls. Air may then be supplied through inlet 34 after which a leaching liquid such as water may be fed through inlet 35 to leach the film and form a membrane 36 which will shrink and release from the tube walls as shown and drop into a suitable container. After further leaching the membranes may be cured in a hot water bath.

Figure 4:
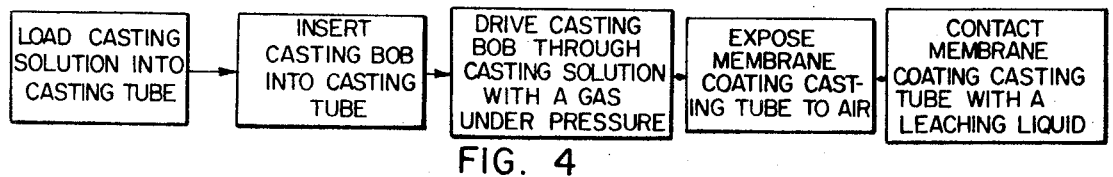
FIG. 4 shows a flow diagram of the method of the invention.

The method of this invention as described above is illustrated by the flow diagram of FIG. 4 and by the specific example hereinbelow.

EXAMPLE I

A membrane casting solution based on cellulose acetate with a leachable solvent and swelling agent was prepared by mixing 5 oz. cellulose acetate (Eastman grade E-398-10), 9 oz. acetone and 6 oz. formamide swelling agent. This casting solution, having a viscosity of about 20,000 cps., was introduced into a 4 ft. long, clean, dry glass tube having a 0.498 in. inside diameter by attaching a vacuum hose to one end of the tube, dipping the other end into the casting solution and applying a vacuum of 8″ Hg. The casting solution was slowly drawn into the tube until it filled one-third of the length. The vacuum hose was removed and excess solution wiped off the bottom end of the glass tube.

The casting bob was made of Teflon (polytetrafluoroethylene) and was ¾ inch long with a ½ inch long tapered conical front and a ¼ inch long cylindrical surface end. The cylindrical end was the widest part of the bob and had a circular cross-section with a 0.463 inch outside diameter. The casting bob cylindrical end had an outside diameter 0.035 inch smaller than the inside diameter of the glass casting tube. The casting tube was reversed so that the end containing the casting solution was on top. The casting bob was inserted into the viscous solution at the end of the tube. The hose was then connected to the wiped end of the tube.

Nitrogen gas, provided from a Watts No. N-26-2 regulator, was passed through a drying tube containing a commercial desiccant and bubbled through acetone to saturate it with the solvent. This gas was used to drive the casting bob through the tube at 12 p.s.i.g. pressure and at a velocity of approximately 3 inches/sec. The casting bob pushed the casting solution in front of it and around it in the annulus between the tube and bob, leaving a tubular film of casting solution having a thickness of about 15–17 mils (0.015–0.017″) behind, adhering to the inside glass tube wall. The excess casting solution and bob were caught in a casting solution reservoir. The hydraulically stable conical front and cylindrical end of the bob make it self-centering especially when driven under pressure and assures that it deposits an even film thickness at all points down the tube even though the tube may not be perfectly straight. It is important that the casting tube be vertical during this operation although this is less critical as gas pressure is increased. We found that the acetone in the gas helped produce membranes with somewhat more uniform properties, although the use of water dry air alone also produced good results. The process of loading and film casting took about 2 minutes and was performed at room temperature (about 25° C.).

The tube with the cast film was allowed to air dry in the casting tube for about 60 seconds and then the casting tube was immersed in a bath containing ice water at 34° F. for 30 minutes to leach the acetone and formamide from the cast film and form a unitary, porous, reverse osmosis membrane containing a thin active osmotic skin on the inside of the membrane structure. During leaching, the membrane shrank to its final thickness of about 8 mils (0.008″) and was released from the glass support casting tube. The maximum-to-minimum thickness variation of the membrane was 0.006″ to 0.01″ with an average thickness of 0.008″.

Four foot long reverse osmosis membrane tubes made as above were inserted into a porous support module, cured at 180° F. in a hot water bath and tested on a brackish water feed containing 5,000 p.p.m. salt (NaCl) at 600 p.s.i.g. Results showed 24.5 gallons per day per square foot at 90% salt rejection.

We claim:

1. A method of producing a unitary, tubular reverse osmosis membrane comprising the steps:
   (1) placing a casting solution, comprising a polymeric film forming cellulosic material, selected from the group consisting of cellulosic ethers and cellulosic esters, a leachable organic solvent and a leachable organic pore producing swelling agent, into an apparatus containing at least one hollow tube,
   (2) placing a casting bob having a circular crosssection at its widest point and a hydraulically stable geometry with an outer diameter between 0.02 and 0.08 inch smaller than the inner diameter of the tube into one end of the tube,
   (3) pushing the casting bob through the casting solution at a velocity of between about 0.3 to 12 inches/second with a gas under pressure while the tube is in a generally vertical position to form a continuous film of casting solution on the inside of the tube,
   (4) exposing the film to air; and
   (5) contacting the film with a leaching liquid to form a reverse osmosis membrane.

2. The method of claim 1 wherein the gas under pressure is saturated with an organic solvent selected from the group consisting of acetone, methyl ethyl ketone, ethyl alcohol and methyl alcohol.

3. The method of claim 1 wherein the film forming material is selected from the group consisting of cellulose acetate, cellulose acetate-butyrate, cellulose propionate and ethyl cellulose, the organic solvent is selected from the group consisting of acetone, methyl ethyl ketone, ethyl alcohol and methyl alcohol and the pore producing swelling agent is selected from the group consisting of triethyl phosphate, tertahydrofurfuryl phosphate and a substantially water soluble amide selected from the group consisting of formamide, dimethyl formamide, methyl formamide and ethyl formamide.

4. The method of claim 3 wherein the casting bob is pushed through the casting solution at a velocity between about 1 to 4 inches/second and in step (5) the film is immersed in a leaching bath.

5. The method of claim 4 wherein the solution is placed in a first end of the casting tube by immersing the first end in casting solution and drawing a vacuum on the other end, the first end is reversed so that it is the top end of the tube and the casting bob is pushed down through the casting solution.

6. The method of claim 4 wherein the leaching bath contains water at between about 32 to 36° F.

7. The method of claim 6 where as a last step the membrane is cured in a hot water bath at a temperature up to 200° F.

8. A method of producing a unitary, tubular reverse osmosis membrane comprising the steps of:
   (1) providing an apparatus having at least one supported tube member,
   (2) placing a casting solution comprising a polymeric film forming cellulosic material, selected from the group consisting of cellulosic esters and cellulosic ethers, a leachable organic solvent and a leachable organic pore producing swelling agent into said tube member,
   (3) placing a casting bob having a circular cross section at its widest dimension and a hydraulically stable geometry with an outer diameter between 0.02 and 0.08 inch smaller than the inner diameter of the tube into one end of said tube member,
   (4) pushing the casting bob through the casting solution at a velocity of between about 0.3 to 12 inches/second with a gas under pressure, while the tube member is in a generally upright position, to remove excess casting solution and leave a continuous film of casting solution on the inside surface of the tube member, and
   (5) removing the film from the tube member to provide a tubular reverse osmosis membrane.

(References on following page)

References Cited

UNITED STATES PATENTS

| | | | |
|---|---|---|---|
| 3,108,012 | 10/1963 | Curtis | 118—254 X |
| 3,432,585 | 3/1969 | Watson et al. | 264—216 X |
| 3,133,132 | 5/1964 | Loeb et al. | 264—49 |
| 3,341,024 | 9/1967 | Lowe et al. | 264—49 |
| 3,429,957 | 2/1969 | Merten | 264—49 |
| 3,446,359 | 5/1969 | Loeb et al. | 264—49 X |
| 3,457,170 | 7/1969 | Havens | 210—500 X |

FOREIGN PATENTS

| | | | |
|---|---|---|---|
| 551,454 | 2/1943 | Great Britain | 117—95 |

OTHER REFERENCES

U.S. Office of Saline Water, "Design and Construction of a Desalination Pilot Plant (Reverse Osmosis)" Research and Development Report No. 86, by Aerojet-General, January 1964, pp. 4–8; 13.

PHILIP E. ANDERSON, Primary Examiner

U.S. Cl. X.R.

106—196; 117—95; 210—500; 264—49, 217, 269